(12) United States Patent
Lim et al.

(10) Patent No.: US 10,320,470 B2
(45) Date of Patent: Jun. 11, 2019

(54) TERMINAL USING FREQUENCY BAND OF MOBILE SATELLITE SERVICE FOR LTE/LTE-A

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 130 days.

(21) Appl. No.: 15/510,828

(22) PCT Filed: Aug. 11, 2015

(86) PCT No.: PCT/KR2015/008375
§ 371 (c)(1),
(2) Date: Mar. 13, 2017

(87) PCT Pub. No.: WO2016/047921
PCT Pub. Date: Mar. 31, 2016

(65) Prior Publication Data
US 2017/0310381 A1    Oct. 26, 2017

Related U.S. Application Data

(60) Provisional application No. 62/056,532, filed on Sep. 27, 2014.

(51) Int. Cl.
*H04B 7/185* (2006.01)
*H04B 1/48* (2006.01)
(Continued)

(52) U.S. Cl.
CPC ............ *H04B 7/1853* (2013.01); *H04B 1/48* (2013.01); *H04B 1/52* (2013.01); *H04L 5/14* (2013.01)

(58) Field of Classification Search
CPC .......... H04B 7/1853; H04B 1/48; H04B 1/52; H04L 5/14
See application file for complete search history.

(56) References Cited

U.S. PATENT DOCUMENTS

| 6,115,585 A | 11/2000 | Matero et al. |
| 7,936,714 B1 * | 5/2011 | Karr ..................... H04W 76/10 370/329 |

(Continued)

FOREIGN PATENT DOCUMENTS

| WO | 2011028078 A2 | 10/2011 |
| WO | 2014088218 A1 | 12/2014 |

OTHER PUBLICATIONS

LG Electronics, TP on Dual-duplexer RF architecture for New MSS-band, 3GPP TSG RAN WG4 Meeting #73, R4-147952, Nov. 17-21, 2014, San Francisco, CA.

*Primary Examiner* — Hassan Kizou
*Assistant Examiner* — Deepa Belur
(74) *Attorney, Agent, or Firm* — Dentons US LLP

(57) ABSTRACT

A disclosure of the present specification provides a terminal which uses a frequency band of a mobile satellite service for LTE/LTE-A. The terminal comprises: a first duplexer for separating a transmitted signal and a received signal in band 1 defined in long term evolution (LTE)/LTE-Advanced; a second duplexer for separating a transmitted signal and a received signal in new band 65 which was a mobile satellite service (MSS) band and now is allocated for the terrestrial service; and a selection switch for selecting one of the first duplexer and the second duplexer. Herein, when only band 1 is configured and used, only the first duplexer may be operated by the selection switch. In contrast, when new band 65 is configured and used, wherein the configured band does not overlap the range of band 1, and when new band 65 is configured and used, wherein the configured band overlaps (Continued)

the range of band 1 for carrier aggregation, only the second duplexer may be operated by the selection switch.

5 Claims, 14 Drawing Sheets

(51) Int. Cl.
*H04B 1/52* (2015.01)
*H04L 5/14* (2006.01)

(56) References Cited

U.S. PATENT DOCUMENTS

| | | |
|---|---|---|
| 2003/0076194 A1 | 4/2003 | Machui |
| 2005/0118948 A1* | 6/2005 | Karabinis ............ H04B 7/1853 455/12.1 |
| 2006/0146861 A1* | 7/2006 | Maeda ................... H04L 5/06 370/448 |
| 2007/0232298 A1* | 10/2007 | Karabinis ............ H04B 7/1851 455/427 |
| 2008/0171520 A1* | 7/2008 | Steer .................... H04B 1/0028 455/77 |
| 2011/0103273 A1* | 5/2011 | Dutta ................... H04B 7/0608 370/281 |
| 2012/0202561 A1* | 8/2012 | Robinett ................ H04B 1/006 455/552.1 |
| 2013/0044611 A1* | 2/2013 | Jalali .................. H04B 7/18508 370/252 |
| 2013/0157717 A1* | 6/2013 | Yu ........................ H04B 1/0057 455/553.1 |
| 2013/0314163 A1 | 11/2013 | Costa |
| 2014/0133364 A1* | 5/2014 | Weissman ............ H04B 1/0057 370/273 |
| 2015/0038191 A1* | 2/2015 | Zander .................. H04B 1/006 455/552.1 |
| 2015/0365946 A1* | 12/2015 | Luong ................ H04W 72/0453 370/329 |

* cited by examiner

TERMINAL USING FREQUENCY BAND OF MOBILE SATELLITE SERVICE FOR LTE/LTE-A

CROSS-REFERENCE TO RELATED APPLICATIONS

This application is the National Stage filing under 35 U.S.C. 371 of International Application No. PCT/KR2015/008375, filed on Aug. 11, 2015, which claims the benefit of U.S. Provisional Application No. 62/056,532 filed on Sep. 27, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Recently, the development of 3GPP LTE-Advanced (LTE-A), that is, an evolution of 3GPP LTE, has been completed. In accordance with the LTE-A, a carrier aggregation (CA) technology in which a plurality of bands is grouped into one was suggested.

A frequency band which may be used for LTE/LTE-A, that is, a carrier has been defined in 3GPP by taking into consideration the radio waves of several countries.

Meanwhile, a mobile satellite service (MSS) is to provide a mobile communication service using satellites. For such an MSS, a world organization has assigned a frequency.

However, as the utilization of the MSS is not high, the world organization has permitted a part that belongs to the MSS band and that has low utilization so that the part is used for other purposes. Accordingly, in current 3GPP, a band for using an MSS frequency band for a terrestrial wave is to be expected as an operating band 65. This has been defined as a new frequency band in TR36.862.

SUMMARY OF THE INVENTION

Accordingly, an object of the disclosure of this specification is to propose a scheme in which part of the MSS band is used for LTE/LTE-A.

In order to achieve the object, one disclosure of this specification provides a terminal which uses a frequency band of an MSS for LTE/LTE-A. The terminal may include a first duplexer for separating a transmission signal and a reception signal in a band 1 defined in long term evolution (LTE)/LTE-Advanced; a second duplexer for separating a transmission signal and a reception signal in a new band 65 which has belonged to a mobile satellite service (MSS) band and which has been allocated for a terrestrial wave; and a selection switch for selecting any one of the first duplexer and the second duplexer. In this case, if only the band 1 is configured and used, only the first duplexer may be driven by the selection switch, and if the new band 65 is configured and used, but the configured band does not overlap a range of the band 1, only the second duplexer may be driven by the selection switch.

If the new band 65 is configured and used, but the configured band overlaps the range of the band 1, only the second duplexer may be driven.

The terminal may further include a high band switch which is connected to the first duplexer and the second duplexer; a diplexer which is connected to the high band switch and composes and separates carriers; and an antenna which is connected to the diplexer.

If the transmission signal belongs to the band 1, the transmission signal may be transmitted through the high band switch, the diplexer, and the antenna via the first duplexer driven by the selection switch. In contrast, if the transmission signal belongs to the new band 65, the transmission signal may be transmitted through the high band switch, the diplexer, and the antenna via the second duplexer driven by the selection switch.

A bandwidth supported by the second duplexer may be limited to a maximum of 90 MHz.

In accordance with the disclosure of this specification, part of the MSS band can be used for LTE/LTE-A.

DESCRIPTION OF EXEMPLARY EMBODIMENTS

Figure 1:
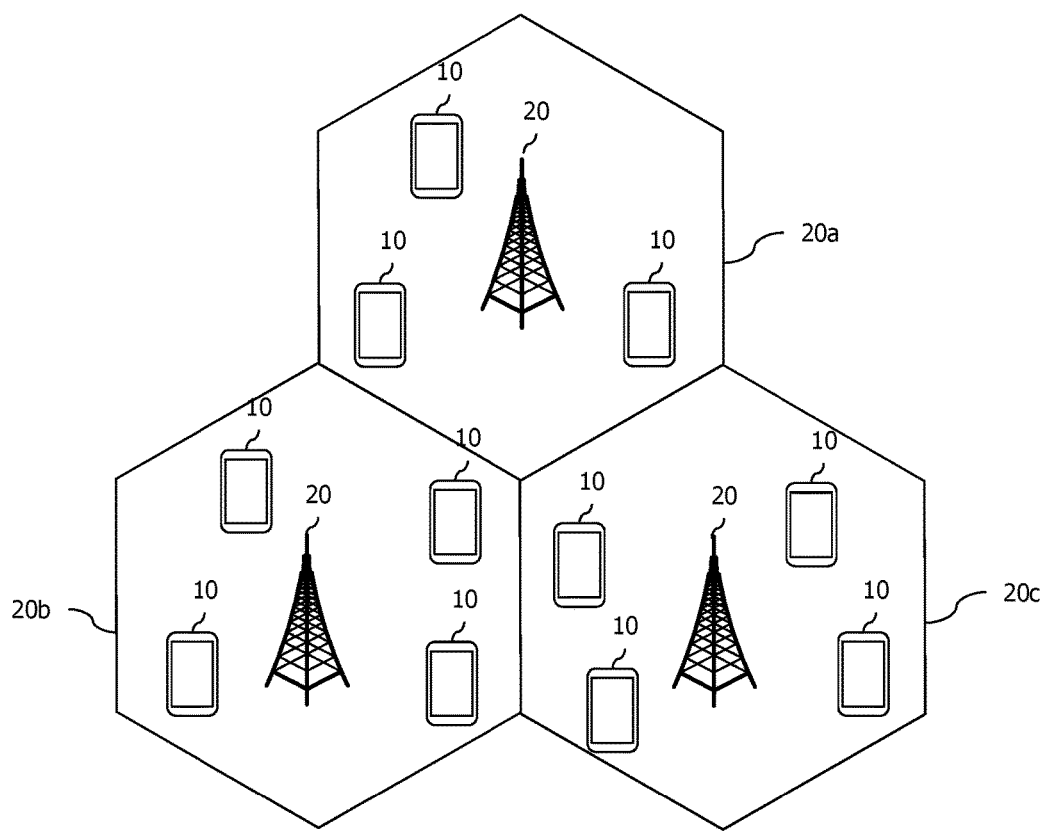
FIG. 1 is an exemplary diagram illustrating a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates an exemplary diagram illustrating a wireless communication system.

As seen with reference to FIG. 1, the wireless communication system includes at least one base station (BS) 20. Each base station 20 provides a communication service to specific geographical areas (generally, referred to as cells) 20a, 20b, and 20c.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
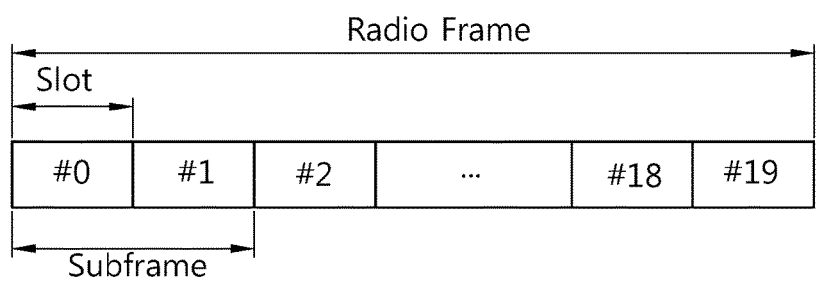
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP).

Figure 3:
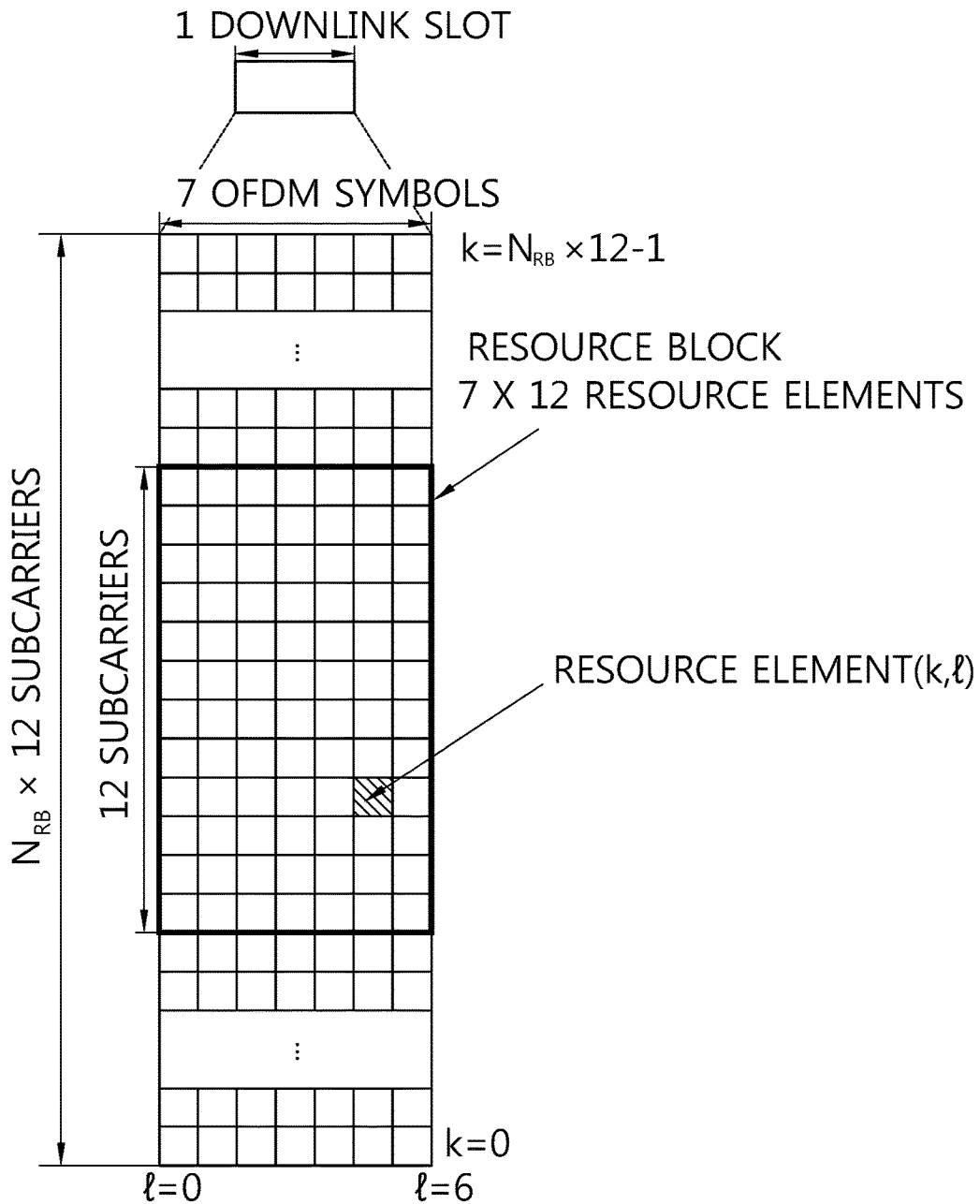
FIG. 3 is an exemplary diagram illustrating a resource grid for one uplink or downlink slot in the 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
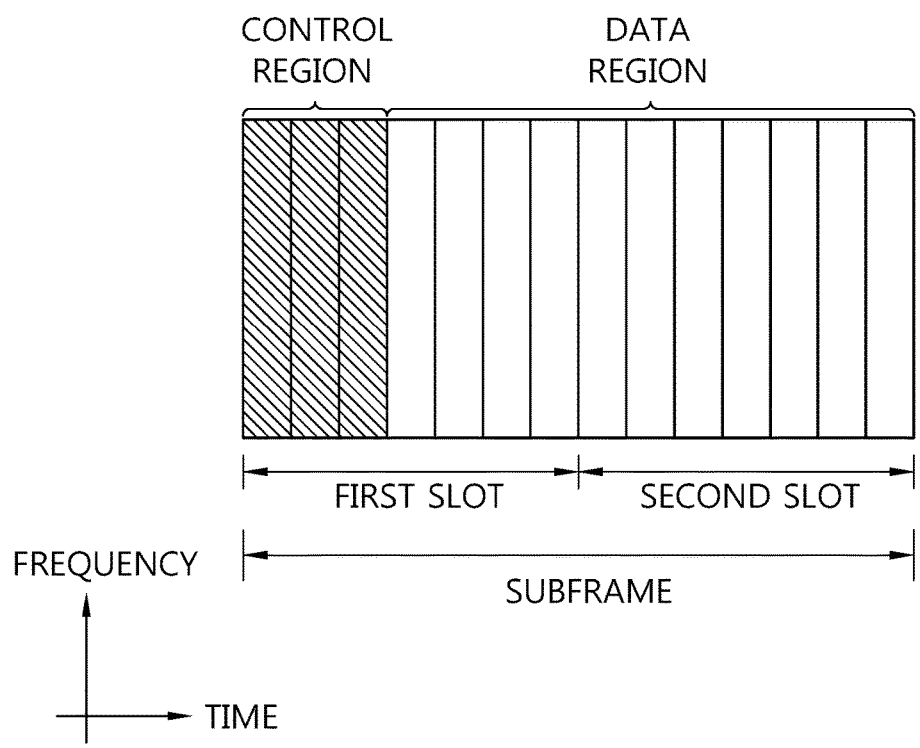
FIG. 4 illustrates a structure of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
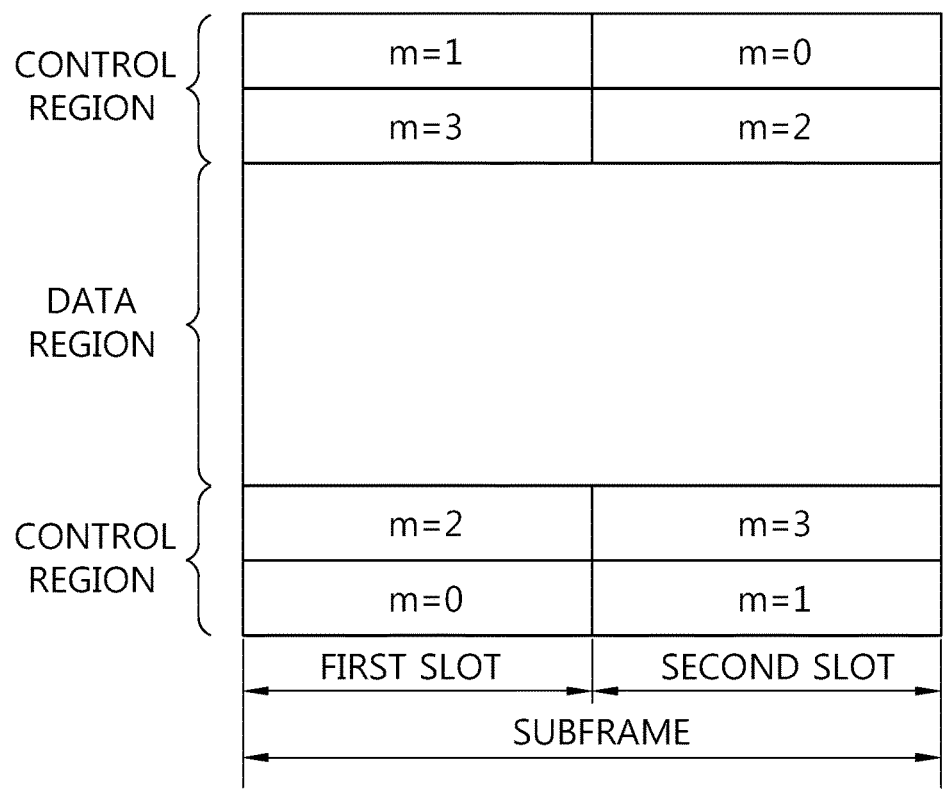
FIG. 5 illustrates the architecture of an uplink sub-frame in 3GPP LTE.
Figure 5:
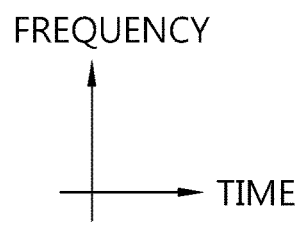

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The UE may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

A CA system may be divided into a contiguous CA system in which aggregated carriers are contiguous and a non-contiguous CA system in which aggregated carriers are not contiguous. If a CA system is simply described hereinafter, it should be understood that the CA system includes both a case where component carriers are contiguous and a case where component carriers are not contiguous. The number of aggregated CAs may be differently set in downlink and uplink. A case where the number of DL CCs and the number of UL CCs are the same is called a symmetric aggregation, and a case where the number of DL CCs and the number of UL CCs are different is called an asymmetric aggregation.

Meanwhile, a CA technology may be divided into an inter-band CA technology and an intra-band CA technology. The inter-band CA is a method for aggregating and using CCs present in different bands. The intra-band CA is a method for aggregating and using CCs within the same frequency band. Furthermore, more specifically, the CA technology is divided into an intra-band contiguous CA, an intra-band non-contiguous CA, and an inter-band non-contiguous CA.

Figure 6A:
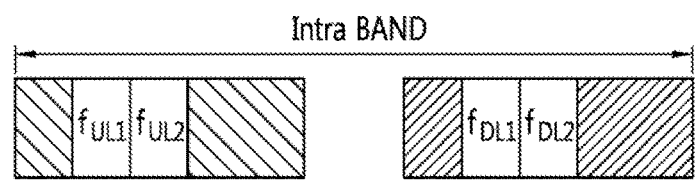
FIGS. 6a and 6b are conceptual diagrams showing an intra-band carrier aggregation (CA).
Figure 6B:
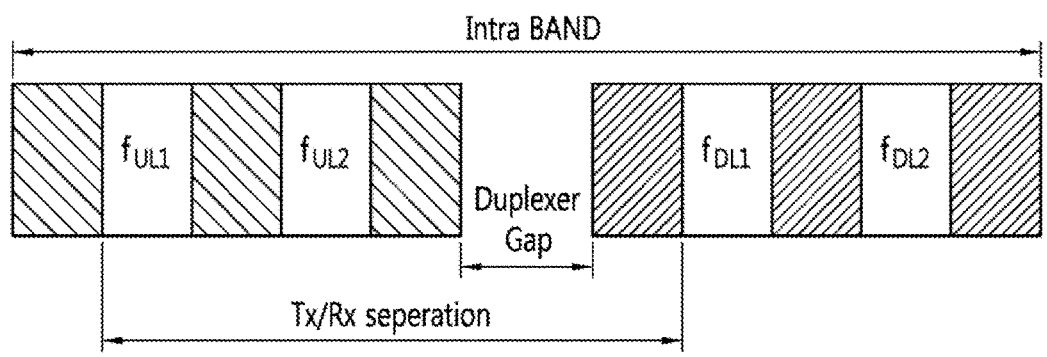

FIGS. 6a and 6b are conceptual diagrams showing an intra-band carrier aggregation (CA).

FIG. 6a shows an intra-band contiguous CA, and FIG. 6b shows an intra-band non-contiguous CA.

In the case of LTE-Advanced, in order to realize high-speed wireless transmission, various schemes including uplink MIMO and a carrier aggregation (CA) have been added. A CA being discussed in LTE-Advanced may be divided into the intra-band contiguous CA shown in FIG. 6a and the intra-band non-contiguous CA shown in FIG. 6b.

Figure 7A:
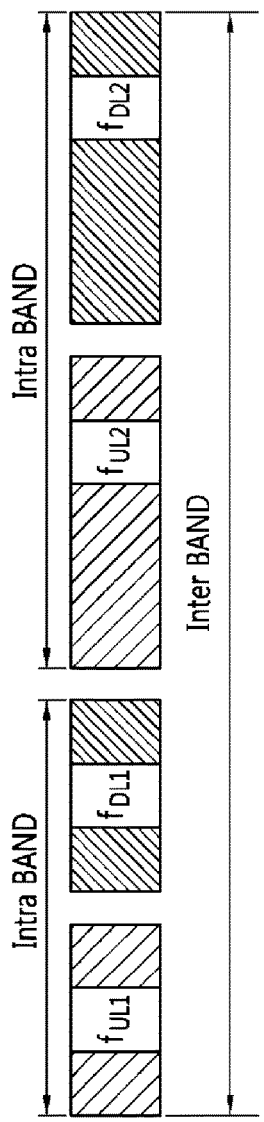
FIGS. 7a and 7b are conceptual diagrams showing an inter-band CA.
Figure 7B:
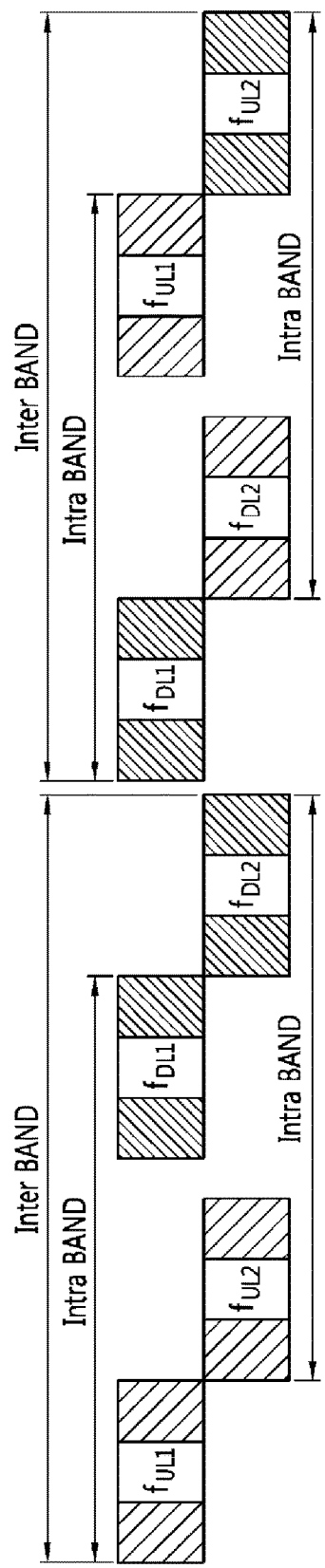

FIGS. 7a and 7b are conceptual diagrams showing an inter-band CA.

FIG. 7a shows the coupling of a low band and a high band for an inter-band CA, and FIG. 7b shows the coupling of similar frequency bands for an inter-band CA.

That is, an inter-band CA may be divided into an inter-band CA between low-band and high-band carriers having different RF characteristics, as shown in FIG. 7a, and an inter-band CA of similar frequencies having similar RF characteristics in which a common RF terminal can be used for each component carrier, as shown in FIG. 7b.

TABLE 1

| E-UTRA operating band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |

TABLE 1-continued

| E-UTRA operating band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

An MSS frequency band has not yet been defined so far in Table 1, but the allocation of a frequency band in 3GPP to be used for a terrestrial wave will be expected to be defined as an operating band 65. This has been defined as a new frequency band in TR36.862.

Meanwhile, in 3GPP LTE/LTE-A systems, operating bands for uplink and downlink, such as in Table 1, are defined. Four CA cases of FIGS. 6 and 7 are classified based on Table 1.

In this case, $F_{UL\_low}$ means the lowest frequency of an UL operating band. Furthermore, $F_{UL\_high}$ means the highest frequency of an UL operating band. Furthermore, $F_{DL\_low}$ means the lowest frequency of a DL operating band. Furthermore, $F_{DL\_high}$ means the highest frequency of a DL operating band.

If operating bands are defined as in Table 1, the frequency distribution organization of each country may assign a specific frequency to a service provider according to the situation of each country.

Figure 8:
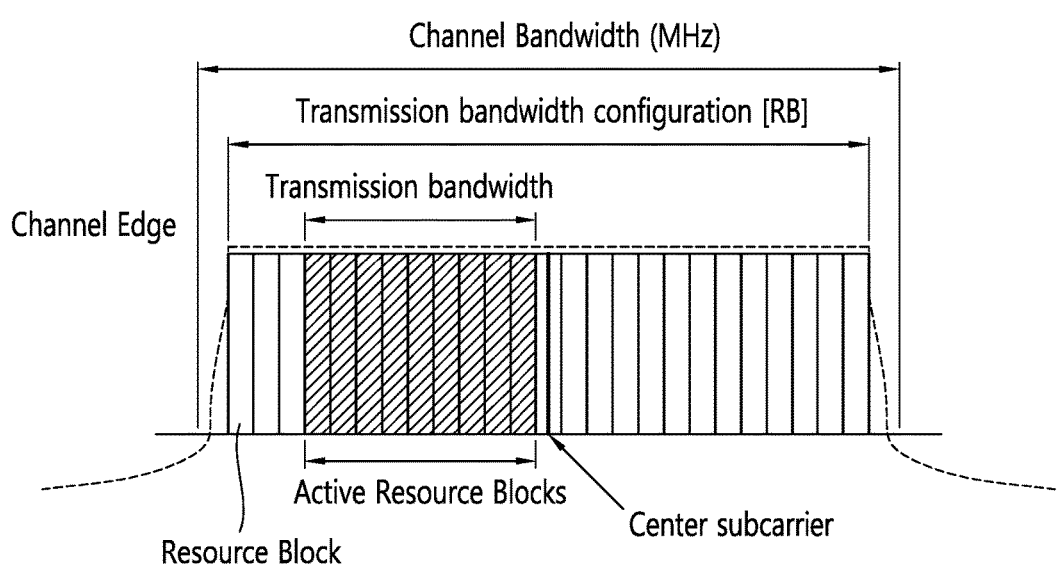
FIG. 8 shows a relation between a channel band MHz and a resource block (RB).

FIG. 8 shows a relation between a channel band MHz and a resource block (RB).

As may be seen with reference to FIG. 8, a transmission bandwidth smaller than a channel bandwidth $BW_{Channel}$ is set. The setting of the transmission bandwidth is performed by a plurality of resource blocks (RBs). Furthermore, the outskirt of a channel is the highest and lowest frequencies separated by the channel bandwidth.

Meanwhile, as described above, a 3GPP LTE system supports channel bandwidths of 1.4 MHz, 3 MHz, 5 MHz, 10 MHz, 15 MHz and 20 MHz. A relation between such a channel bandwidth and a resource block is listed in the following table.

TABLE 2

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Meanwhile, part of the mobile satellite service (MSS) band that has been rarely used conventionally has been allowed to be used for other purposes.

Accordingly, the inventors of the present invention researched whether the existing operating band 1 and the 30 MHz band of the MSS band were combined and a total of 90 MHz band (i.e., 1920 MHz-2010 MHz) could be used in LTE/LTE-A. This is described with reference to FIG. 9.

Figure 9:
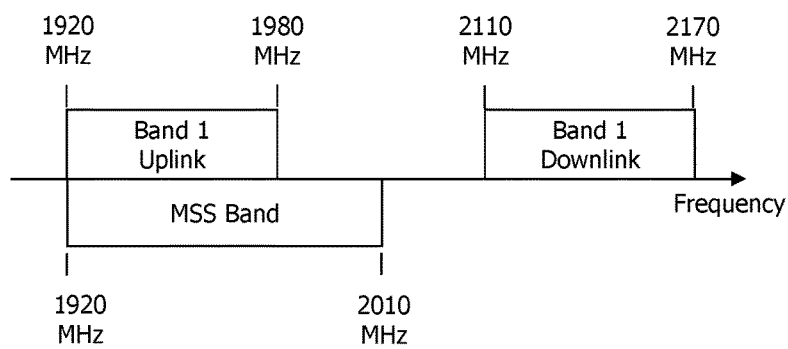
FIG. 9 shows a relation between a band 1 and a new band 65 defined in LTE/LTE-A.

FIG. 9 shows a relation between a band 1 and a new band 65 defined in LTE/LTE-A.

As may be seen with reference to FIG. 9, the 90 MHz band (i.e., 1920 MHz-2010 MHz), that is, a new frequency operating band 65, partially overlaps the band 1 (refer to Table 1) defined in the existing LTE/LTE-A. This is a scheme for increasing the utilization of a frequency. If the 90 MHz band is defined as described above, the new band needs to be supported by a single terminal along with the band 1. That is, from a viewpoint of the RF design of UE, whether the 90 MHz (i.e., 1920 MHz-2010 MHz) of the new band 65 can be supported needs to be reviewed.

First, if the RF of UE is designed without an increase of an additional cost, an existing one duplexer designed to support a maximum of the 60 MHz bandwidth of the band 1 is used without any change, but a scheme for designing the duplexer to support even the 90 MHz bandwidth may be present. To this end, however, there are disadvantages in that an insertion loss (IL) of 1.8 dB is additionally generated and thus performance is deteriorated. As a result, if such performance deterioration is not tolerated, the scheme may be considered to be not a better scheme.

Accordingly, the inventors of the prevent invention decided to research a scheme for adding a separate duplexer to the RF of UE for the purpose of the 90 MHz (i.e., 1920 MHz-2010 MHz) of the new band 65. This is described with reference to FIGS. 10a and 10b.

Figure 10A:
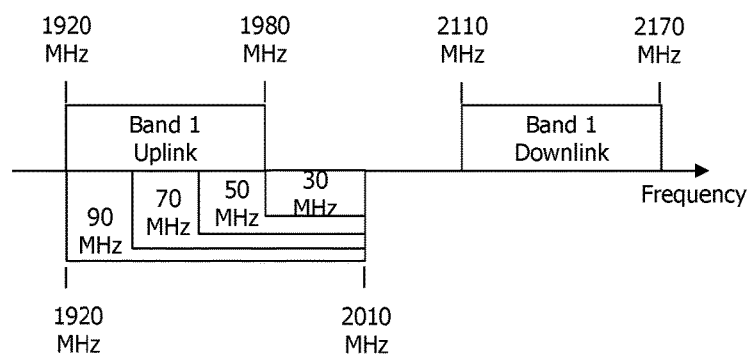
FIG. 10a shows an example in which a new band 90 MHz supports LTE/LTE-A using a filter supporting a bandwidth of 30 MHz, 50 MHz, 70 MHz or 90 MHz.
Figure 10B:
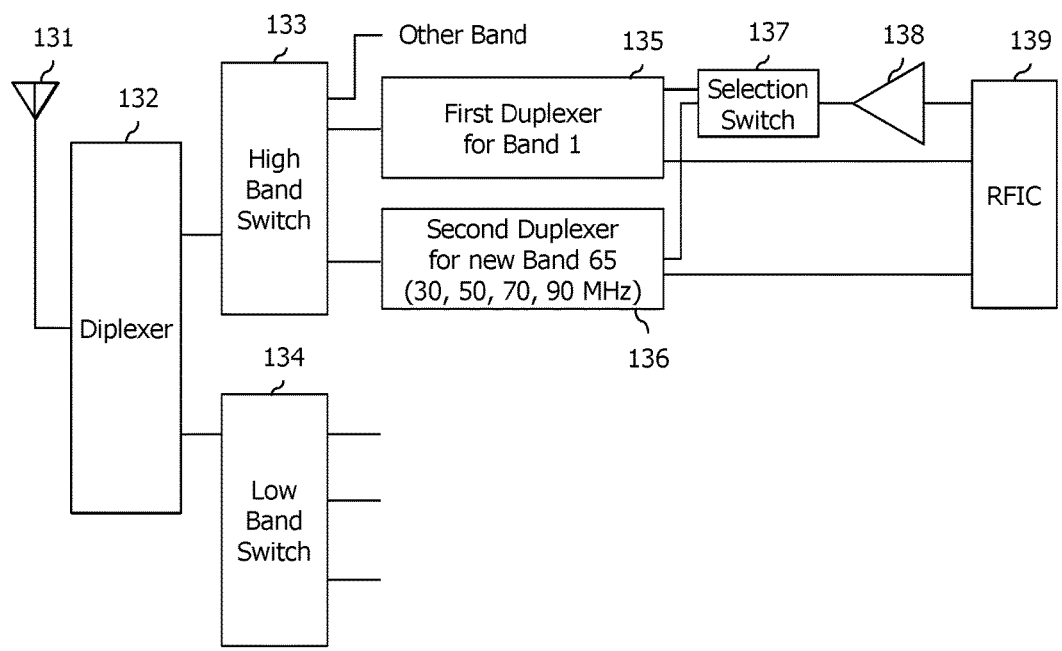
FIG. 10b is a configuration diagram schematically showing the RF structure of UE for a first embodiment of the present invention.

FIG. 10a shows an example in which the new band 90 MHz supports LTE/LTE-A using a filter supporting the bandwidth of 30 MHz, 50 MHz, 70 MHz or 90 MHz, and FIG. 10b is a configuration diagram schematically showing the RF structure of UE for a first embodiment of the present invention.

As may be seen with reference to FIG. 10a, the new band 65 may be configured to support the bandwidth of 30 MHz, 50 MHz, 70 MHz or 90 MHz depending on the requirements of a service provider. For example, the bandwidth of 30 MHz that belongs to the new band 65 and that ranges from 1980 MHz to 2010 MHz may be configured. Furthermore, the bandwidth of 50 MHz that belongs to the new band 65 and that ranges from 1960 MHz to 2010 MHz may be configured. Likewise, the bandwidth of 70 MHz that belongs to the new band 65 and that ranges from 1940 MHz to 2010 MHz may be configured. Finally, the bandwidth of 90 MHz that fully overlaps the existing band 1 and that ranges from 1920 MHz to 2010 MHz may be configured.

In order to support each of the cases, a first embodiment of the present invention proposes an RF structure, such as that of FIG. 10b.

As may be seen with reference to FIG. 10b, the RF unit 130 of UE includes an antenna 131, a diplexer 132, a high band switch 133, a low band switch 134, a first duplexer 135 for the band 1, a second duplexer 136 for the new band 65, a selection switch 137, a low noise amplifier 138, and an RFIC 139.

The diplexer 132 functions to compose/separate carriers and is connected to the switch 133 for a low band and the switch 134 for a high band. The high band switch 133 selectively exchanges signals with any one of the first duplexer 135 for the band 1 and the second duplexer 136 for the new band 65. The selection switch 137 selectively transfers a transmission signal to the first duplexer 135 for the band 1 and the second duplexer 136 for the new band 65. The second duplexer 136 for the new band 65 can support the bandwidth of 30 MHz, 50 MHz, 70 MHz or 90 MHz.

Meanwhile, the operations of the two duplexers 135 and 136 are described below.

Figure 11A:
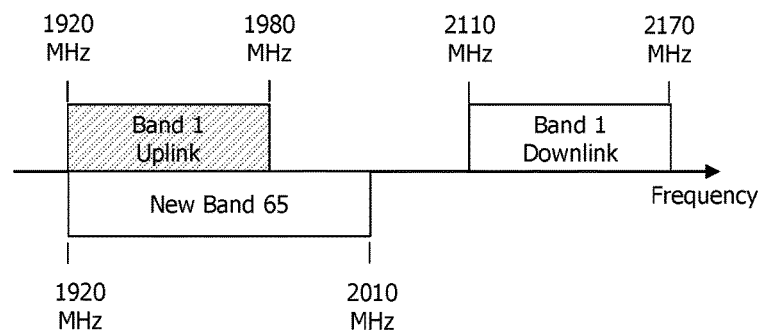
FIG. 11a shows an example in which only the band 1 has been configured.
Figure 11B:
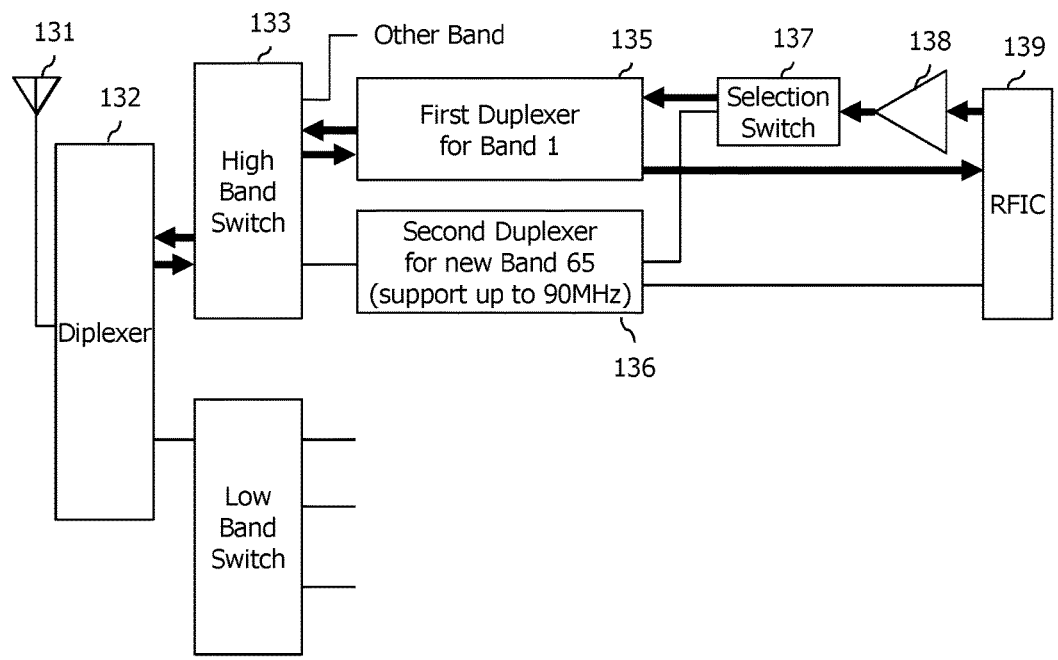
FIG. 11b shows an operation in which the RF structure according to the present invention supports the band 1.

FIG. 11a shows an example in which only the band 1 has been configured, and FIG. 11b shows an operation in which the RF structure according to the present invention supports the band 1.

As may be seen with reference to FIG. 11a, if only the band 1 has been configured as in a conventional technology, only the first duplexer 135 of the RF unit for the band 1 may be driven as shown in FIG. 11b.

More specifically, a transmission process is described below. As shown in FIG. 11b, a transmission signal output by the RFIC 139 is amplified through the low noise amplifier 138. At this time, the selection switch 137 connects the low noise amplifier 138 to the first duplexer 135 for the band 1. Accordingly, the amplified transmission signal is transmitted through the antenna 131 via the first duplexer 135 for the band 1 and the diplexer 132.

A reception process is described below. As shown in FIG. 11b, a signal received through the antenna 131 is transferred to the high band switch 133 through the diplexer 132. If the band of the reception signal corresponds to the band 1, the high band switch 133 transfers the reception signal to the first duplexer 135 for the band 1. The first duplexer 135 transfers the reception signal to the RFIC 139.

As described above, if only the band 1 has been configured, there is no great change in reception sensitivity (REFSENS) and MOP in the band 1 because the transmission signal and the reception signal are not input to the second duplexer 136 for the new band. In other words, if a CA between the band 1 and the new band is not configured, but only the band 1 is configured, UE may use only the first duplexer 135 for the band 1, and thus the existing requirements (i.e., REFSENS and MOP) can be satisfied without any change.

In summary, the duality of the duplexer proposed in the present invention can satisfy the existing requirements (i.e., REFSENS and MOP) without any change because performance deterioration is not generated if only the band 1 is configured in UE although the RF structure is adopted in the UE.

Figure 12A:
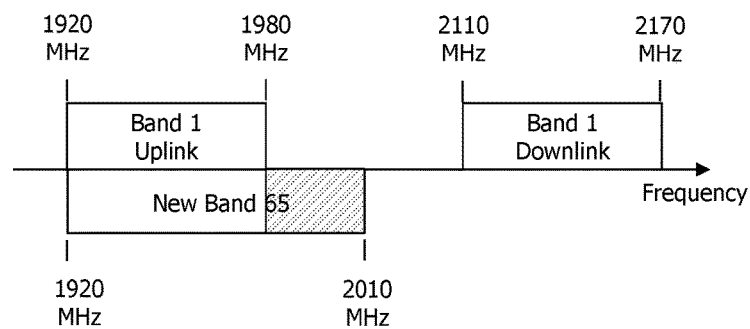
FIG. 12a shows an example in which only a new band not overlapped with the range of the band 1 has been configured.
Figure 12B:
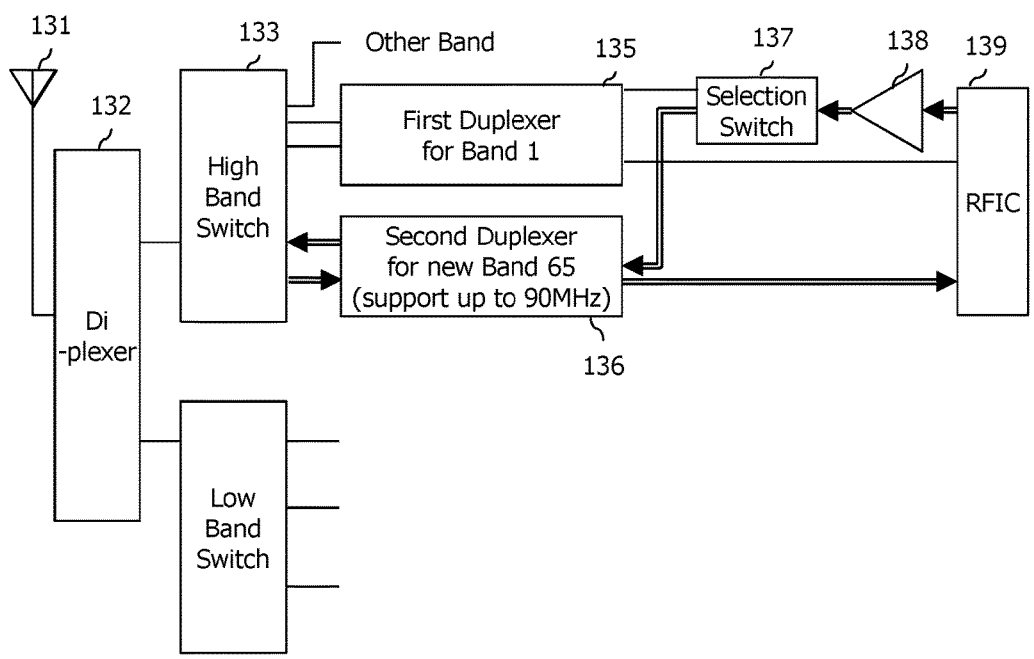
FIG. 12b shows an operation of the RF structure according to the present invention.

FIG. 12a shows an example in which only the new band not overlapped with the range of the band 1 has been configured, and FIG. 12b shows an operation of the RF structure according to the present invention.

As may be seen with reference to FIG. 12a, if the new band 65 (e.g., the bandwidth of 30 MHz from 1980 MHz to 2010 MHz) not overlapping the range of the band 1 has been configured, only the second duplexer 136 of the RF unit may be driven as shown in FIG. 12b.

More specifically, a transmission process is described below. As shown in FIG. 12b, a transmission signal output by the RFIC 139 is amplified through the low noise amplifier 138. At this time, the selection switch 137 connects the low noise amplifier 138 to the second duplexer 136 for the new band 65. Accordingly, the amplified transmission signal is transmitted to the antenna 131 through the second duplexer 136 for the new band 65 and the diplexer 132.

A reception process is described below. As shown in FIG. 12b, a signal received through the antenna 131 is transferred to the high band switch 133 through the diplexer 132. If the band of the reception signal corresponds to the new band 65, the high band switch 133 transfers the reception signal to the second duplexer 136 for the new band 65. The second duplexer 136 transfers the reception signal to the RFIC 139.

Figure 13A:
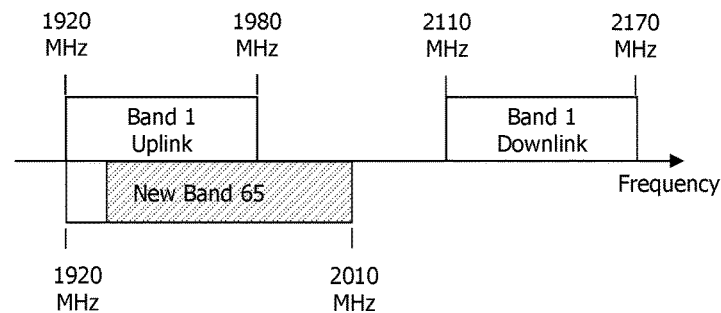
FIG. 13a shows an example in which a new band 65 has been configured to overlap the range of the band 1.
Figure 13B:
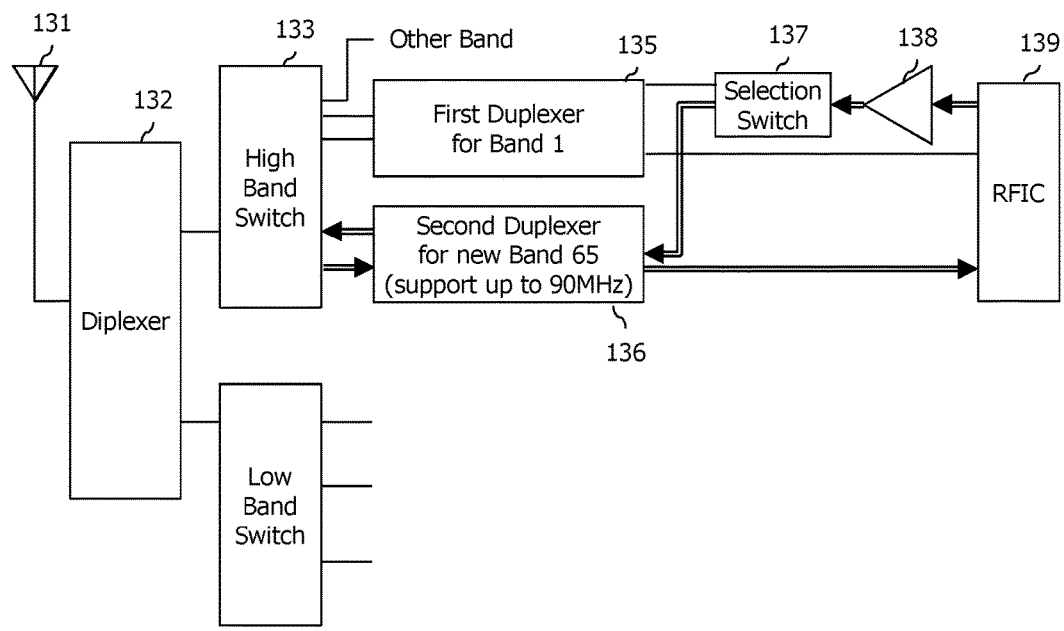
FIG. 13b shows an operation of the RF structure according to the present invention.

FIG. 13a shows an example in which the new band 65 has been configured to overlap the range of the band 1, and FIG. 13b shows an operation of the RF structure according to the present invention.

As shown in FIG. 13a, the new band 65 is configured, but the new band 65 may be configured to overlap the band 1.

In such a case, as shown in FIG. 13b, only the second duplexer may be driven.

Meanwhile, if a CA between the band 1 and the new band 65 is configured, only the second duplexer may be driven. In this case, however, REFSENS and MOP, that is, the existing requirements, may not be satisfied.

In order to minimize such an influence, if the duplexer for the new band is limited to 70 MHz, a CA can be supported and the existing MOP and REFSEN requirements can also be satisfied.

Accordingly, the second embodiment of the present invention proposes a scheme for supporting the second duplexer 136 for the new band 65 up to only the bandwidth of 70 MHz if a CA is supported. In such a case, an insertion loss attributable to the second duplexer 136 may not be a problem because the insertion loss is the same as that of the first duplexer 135. In this case, however, a CA with the 1920-1940 MHz frequency of the band 1 may not support the existing REFSENS and MOP performance.

The second embodiment may be effective if a situation, such as a contiguous intra-band CA or a non-contiguous intra-band CA in which both a first carrier and a second carrier are located within the 70 MHz bandwidth supported by the second duplexer 135, is satisfied.

That is, in accordance with the second embodiment, if only the second duplexer for the new band is used, but a bandwidth supported by the duplexer is limited to up to 70 MHz (i.e., from 1940 MHz to 2010 MHz), it will be effective because performance that may be obtained in the band 1 can also be maintained.

A conclusion is summarized as follows.

A conclusion 1: by adding the second duplexer 136 for the new band 65 to the RF structure of UE in addition to the first duplexer 135 for the band 1, the existing RF requirements in the band 1 can be reserved without any change because the first duplexer does not influence performance in the band 1 although the duplexer is dualized.

A conclusion 2: by adding the second duplexer 136 supporting the bandwidth of 90 MHz within the new band 65 to the RF structure of UE in addition to the first duplexer 135 for the band 1, there is a possibility that REFSENS and MOP may be deteriorated due to the second duplexer 136 supporting the bandwidth of 90 MHz of a CA between the band 1 and the new band is configured.

A conclusion 3: if a bandwidth supported by the duplexer for the new band is limited to up to 70 MHz in the case of a CA, it will be effective because performance that may be obtained the band 1 can also be maintained. However, a CA with the 1920-1940 MHz frequency of the band 1 may not support the existing REFSENS and MOP performance.

The embodiments of the present invention described so far may be implemented through various means. For example, the embodiments of the present invention may be implemented by hardware, firmware, software or a combination of them. This is described in detail with reference to the following drawing.

Figure 14:
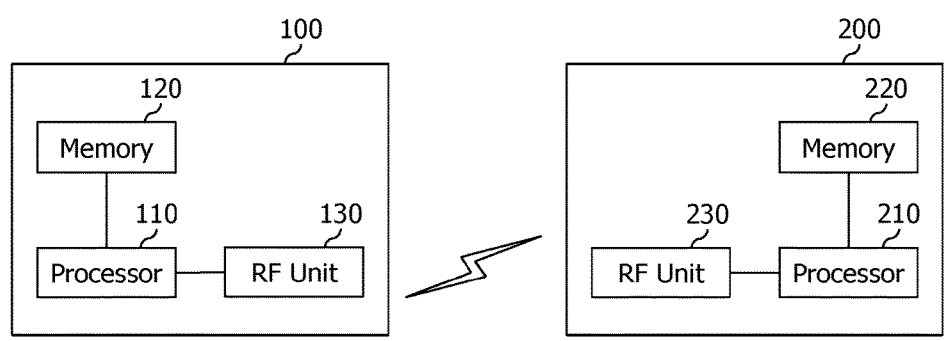
FIG. 14 is a block diagram showing a wireless communication system in which the disclosure of this specification has been implemented.

FIG. 14 is a block diagram showing a wireless communication system in which the disclosure of this specification has been implemented.

A base station 200 includes a processor 210, memory 220, and a radio frequency (RF) unit 230. The memory 220 is connected to the processor 210 and stores a variety of pieces of information for driving the processor 210. The RF unit 230 is connected to the processor 210 and sends and/or receives a radio signal. The processor 210 implements the proposed functions, processes and/or methods. In the aforementioned embodiments, the operation of the base station may be implemented by the processor 210.

UE 100 includes a processor 110, memory 120, and an RF unit 130. The memory 120 is connected to the processor 110 and stores a variety of pieces of information for driving the processor 110. The RF unit 130 is connected to the processor 110 and sends and/or receives a radio signal. The processor 110 implements the proposed functions, processes and/or methods.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include baseband circuits for processing radio signals. When an embodiment is implemented in software, the aforementioned scheme may be implemented as a module (process or function) that performs the aforementioned function. The module may be stored in the memory and executed by the processor. The memory may be located inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A terminal, comprising:
   a first duplexer for separating a transmission signal and a reception signal in a band 1 defined in long term evolution (LTE)/LTE-Advanced;
   a second duplexer for separating a transmission signal and a reception signal in a new band 65 which has belonged to a mobile satellite service (MSS) band and which has been allocated for a terrestrial wave; and
   a selection switch for selecting any one of the first duplexer and the second duplexer,
   wherein if only the band 1 is configured and used, the selection switch selects the first duplexer for using the band 1, and if the new band 65 is configured and used, but the configured band does not overlap a range of the band 1, the selection switch selects the second duplexer for using the new band 65, and
   wherein if the new band 65 is configured and used, but the configured band overlaps the range of the band 1, the selection switch selects the second duplexer for using the new band 65, and the second duplexer supports only a bandwidth of 70 MHz for the new band 65.

2. The terminal of claim 1, further comprising:
   a high band switch which is connected to the first duplexer and the second duplexer;
   a diplexer which is connected to the high band switch and composes and separates carriers; and
   an antenna which is connected to the diplexer.

3. The terminal of claim 2, wherein:
   if the transmission signal belongs to the band 1, the transmission signal is transmitted through the high band switch, the diplexer, and the antenna via the first duplexer driven by the selection switch, and
   if the transmission signal belongs to the new band 65, the transmission signal is transmitted through the high band switch, the diplexer, and the antenna via the second duplexer driven by the selection switch.

4. The terminal of claim 1, wherein the band 1 comprises a transmission band of 1920 MHz to 1980 MHz and a reception band of 2110 MHz to 2170 MHz.

5. The terminal of claim 1, wherein the new band 65 comprises a transmission band of 1920 MHz to 2010 MHz and a reception band of 2110 MHz to 2200 MHz.

\* \* \* \* \*